United States Patent
Maruyama et al.

(10) Patent No.: US 7,576,520 B2
(45) Date of Patent: Aug. 18, 2009

(54) POWER GENERATION CONTROL DEVICE FOR VEHICLE GENERATOR

(75) Inventors: Toshinori Maruyama, Anjo (JP); Kenji Oshima, Okazaki (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 11/582,430

(22) Filed: Oct. 18, 2006

(65) Prior Publication Data

US 2007/0115866 A1 May 24, 2007

(30) Foreign Application Priority Data

Oct. 18, 2005 (JP) .............................. 2005-302508

(51) Int. Cl.
*H02P 11/00* (2006.01)
*H02P 9/00* (2006.01)
*H02H 7/06* (2006.01)

(52) U.S. Cl. ............................... 322/28; 322/36
(58) Field of Classification Search ................ 322/28, 322/36
See application file for complete search history.

(56) References Cited

U.S. PATENT DOCUMENTS

| | | | | |
|---|---|---|---|---|
| 3,287,555 A * | 11/1966 | Livingston et al. | ...... | 246/187 B |
| 4,471,287 A * | 9/1984 | Morishita et al. | ............. | 322/99 |
| 5,303,260 A * | 4/1994 | Fonnesbeck et al. | ........ | 375/141 |
| 5,444,354 A * | 8/1995 | Takahashi et al. | ............. | 322/28 |
| 5,489,809 A * | 2/1996 | Kaya et al. | .................. | 307/126 |
| 5,608,310 A * | 3/1997 | Watanabe | ..................... | 322/29 |
| 5,758,098 A | 5/1998 | Townsley et al. | ............ | 395/282 |
| 5,768,341 A * | 6/1998 | Pryor et al. | .............. | 379/29.11 |
| 6,486,632 B2 * | 11/2002 | Okushima et al. | ........... | 318/599 |
| 6,548,990 B2 * | 4/2003 | Okuno et al. | ................. | 322/36 |
| 6,567,476 B2 | 5/2003 | Kohl et al. | .................. | 375/293 |
| 6,614,207 B2 * | 9/2003 | Maehara et al. | ............... | 322/28 |
| 6,707,276 B2 * | 3/2004 | Takahashi et al. | ............. | 322/28 |
| 6,850,042 B2 * | 2/2005 | Kouwa | ........................ | 322/24 |
| 6,992,465 B2 * | 1/2006 | Aoyama | ...................... | 322/28 |
| 7,009,366 B2 * | 3/2006 | Maehara | ...................... | 322/28 |
| 7,183,750 B2 * | 2/2007 | Asada | .......................... | 322/59 |
| 7,224,148 B2 * | 5/2007 | Watanabe et al. | ............. | 322/59 |
| 7,235,952 B2 * | 6/2007 | Maehara | ...................... | 322/24 |
| 7,294,991 B2 * | 11/2007 | Kimura et al. | ................ | 322/37 |
| 7,300,435 B2 * | 11/2007 | Wham et al. | .................. | 606/34 |
| 7,315,149 B2 * | 1/2008 | Kizawa et al. | ................. | 322/28 |
| 2002/0027789 A1 * | 3/2002 | Okushima et al. | ............. | 363/41 |
| 2002/0030470 A1 * | 3/2002 | Takahashi et al. | ............. | 322/28 |
| 2002/0036485 A1 * | 3/2002 | Okuno et al. | .................. | 322/36 |
| 2002/0057545 A1 * | 5/2002 | Maehara et al. | ............... | 361/78 |
| 2002/0185992 A1 * | 12/2002 | Kouwa | ........................ | 322/28 |
| 2004/0113593 A1 * | 6/2004 | Aoyama | ...................... | 322/28 |
| 2005/0135133 A1 * | 6/2005 | Maehara | ..................... | 363/144 |

(Continued)

FOREIGN PATENT DOCUMENTS

EP    0 651 538 A1    5/1995

*Primary Examiner*—Nicholas Ponomarenko
*Assistant Examiner*—Pedro J Cuevas
(74) *Attorney, Agent, or Firm*—Oliff & Berridge, PLC

(57) ABSTRACT

The power generation control device for a vehicle generator includes an IC circuit including a communication circuit formed therein and having a function of performing a digital communication with an external device through a communication wire, and a resistor mounted to the IC circuit so as to connect the communication circuit to a communication terminal of the power generation control device connected to the communication wire.

8 Claims, 3 Drawing Sheets

U.S. PATENT DOCUMENTS

| | | | |
|---|---|---|---|
| 2006/0082347 A1* | 4/2006 | Asada | 322/59 |
| 2006/0091864 A1* | 5/2006 | Watanabe et al. | 322/28 |
| 2006/0192533 A1* | 8/2006 | Kimura et al. | 322/22 |
| 2007/0085510 A1* | 4/2007 | Asada | 322/28 |
| 2007/0200534 A1* | 8/2007 | Kizawa et al. | 322/28 |
| 2007/0228735 A1* | 10/2007 | Becker | 290/40 C |
| 2009/0039838 A1* | 2/2009 | Maehara | 322/19 |

* cited by examiner

FIG. 1

POWER GENERATION CONTROL DEVICE FOR VEHICLE GENERATOR

CROSS-REFERENCE TO RELATED APPLICATION

This application is related to Japanese Patent Application No. 2005-302508 filed on Oct. 18, 2005, the contents of which are hereby incorporated by reference.

BACKGROUND OF THE INVENTION

1. Field of the Invention

The present invention relates to a power generation control device for controlling a power generation state of a vehicle generator mounted on a vehicle such as a passenger car or a truck.

2. Description of Related Art

There is known a configuration in which a two-way communication is performed between a voltage control device included in a vehicle generator and an engine control device as disclosed, for example, in U.S. Pat. No. 6,567,476. As disclosed in this document, the voltage control device of the vehicle generator includes a communication circuit having a voltage comparator serving as a communication receiver and a switching transistor serving as a communication driver which are both connected to a communication terminal of the voltage control device. The voltage control device can perform a two-way data transmission and reception with the engine control device through a communication wire connected to the communication terminal.

However, the conventional voltage control device as disclosed in this document has a problem in that the communication receiver thereof may be caused to malfunction if electrical noise goes into the communication circuit through the communication wire and the communication terminal. Such electrical noise includes ESD (Electric Static Discharge), CI noise, and RI noise. Accordingly, it has been desired to improve the EMC (ElectroMagnetic Compatibility) of such a communication circuit performing a low-speed two-way data transmission with the engine control device by suppressing the electrical noise.

SUMMARY OF THE INVENTION

The present invention provides a power generation control device for a vehicle generator including:

an IC circuit including a communication circuit formed therein and having a function of performing a digital communication with an external device through a communication wire; and a resistor mounted to the IC circuit so as to connect the communication circuit to a communication terminal of the power generation control device connected to the communication wire.

According to the present invention, EMC performance of a communication circuit included in a power generation control device for a vehicle generator can be easily improved without incurring high costs because of the structure in which a resistor is mounted as an external component to the IC circuit in order to attenuate external electrical noise arrived at a communication terminal of the power generation control device through a communication wire.

The power generation control device may further include a capacitor mounted to the IC circuit so as to be connected to a connection node between the IC circuit and the resistor at one terminal thereof and to a ground at the other terminal thereof.

The power generation control device may further include a connector housing the communication terminal, and a case integrally formed with the connector and housing the IC circuit, the resistor and the capacitance. In this case, a conductor connected to the resistor at one end thereof and connected to the communication circuit at the other end thereof may be formed in the case.

The resistor and the capacitor may be resin-sealed in the case.

The communication circuit may be configured to perform a low-speed two-way digital communication with the external device.

A resistance of the resistor may be smaller than 200Ω.

Preferably, the resistor is disposed away from the IC circuit by such a distance that the IC circuit is not affected by electromagnetic noise occurring when electrical noise arriving at the communication terminal is attenuated in the resistor.

Other advantages and features of the invention will become apparent from the following description including the drawings and claims.

BRIEF DESCRIPTION OF THE DRAWINGS

In the accompanying drawings:

FIG. 1 is a block diagram showing an electrical structure of a vehicle generator including a power generation control device according to an embodiment of the invention;

PREFERRED EMBODIMENTS OF THE INVENTION

Figure 1:
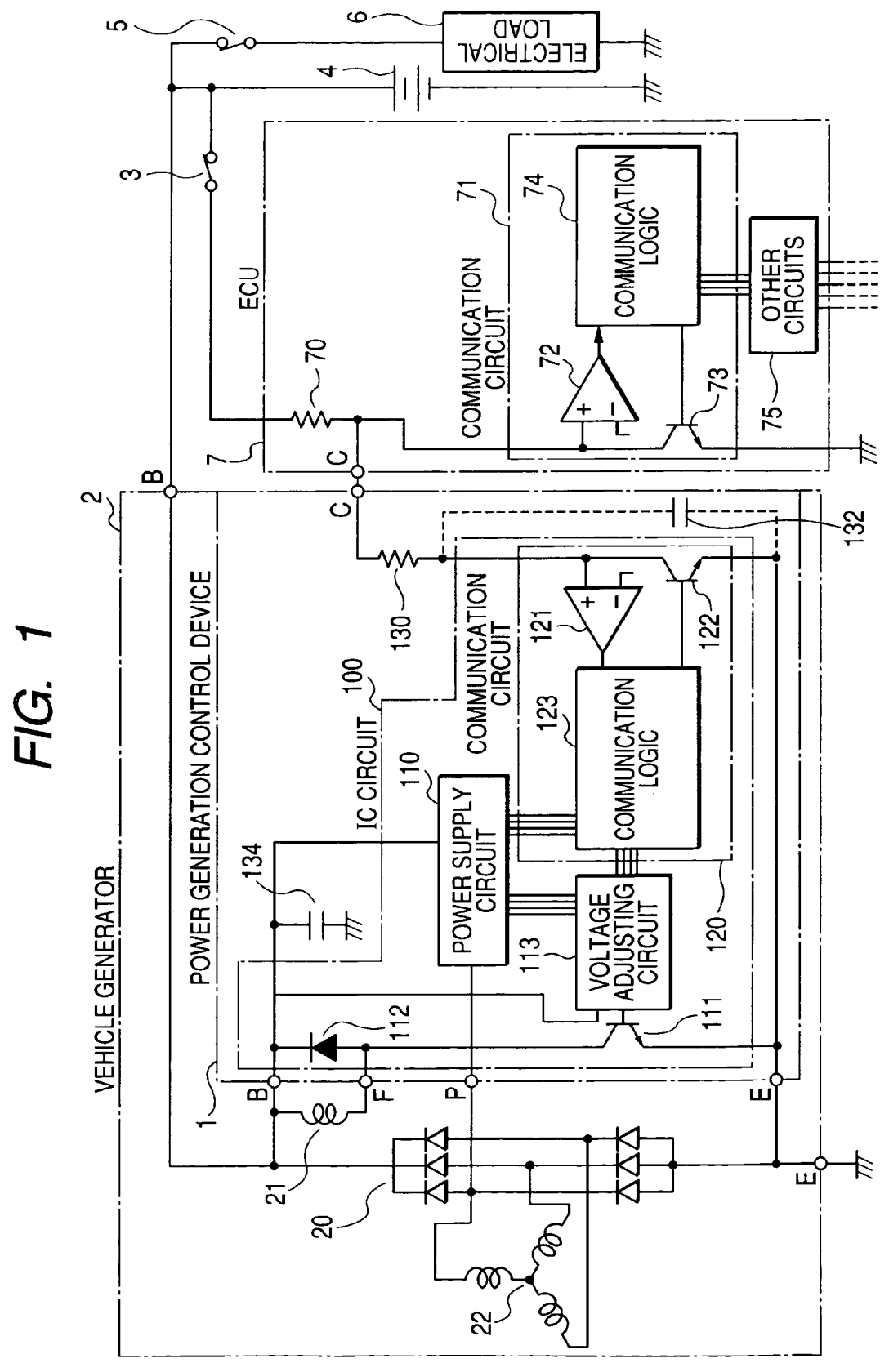
Figure 2:
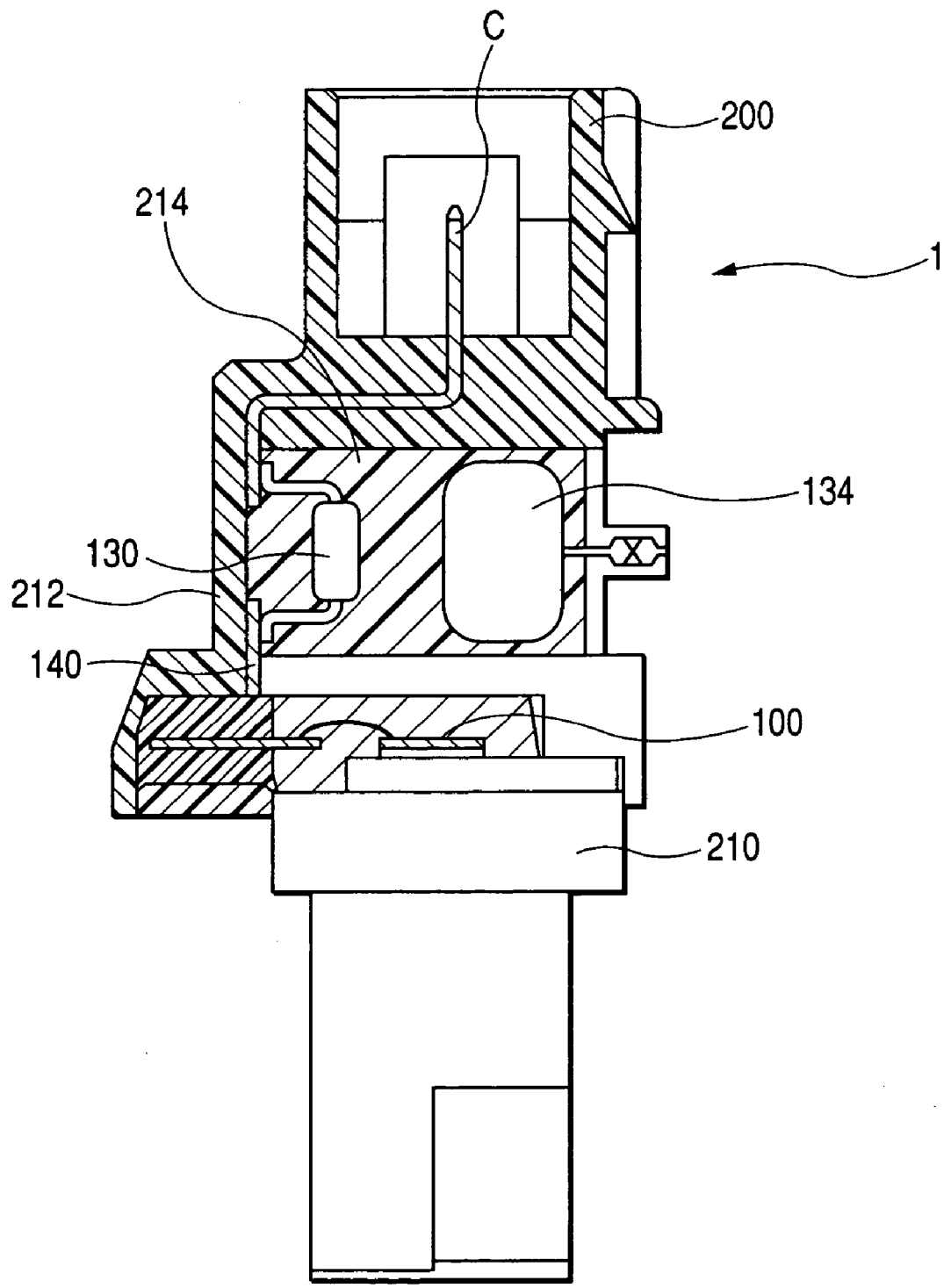
FIG. 2 is a cross-sectional outline view of the power generation control device according to the embodiment of the invention.

FIG. 1 is a block diagram showing an electrical structure of a vehicle generator 2 including a power generation control device 1 according to an embodiment of the invention connected to a vehicle battery 4, an ECU (Electronic Control Unit) 7 as an external control unit, and an electrical load 6.

As show in this figure, the vehicle generator 2 is constituted by a rectifier 20, a rotor having a field winding 21 wound around magnetic poles thereof, an armature having a multi-phase (three-phase, for example) armature winding 22 wound around an armature core thereof, and the power generation control device 1. The vehicle generator 2 is belt-driven by a vehicle engine (not shown) The field winding 21 generates a rotating magnetic field by being supplied with an excitation current. This rotating magnetic field induces an electromotive force (AC voltage) in the armature winding 22. The AC voltage induced in the armature winding 22 is full-wave rectified by the rectifier 20. The output of the rectifier 20 is supplied, as an output voltage of the vehicle generator 2, to the battery 4 through a power supply cable 8 and also to the electrical load 6 through a switch 5. The output voltage of the vehicle generator 2 varies depending on the rotational speed of the rotor, and the excitation current flowing into the field winding 21, which is controlled by the power generation control device 1.

The ECU 7 connected to the power generation control device 1 has a function of giving a start command to the power generation control device 1. As shown in FIG. 1, the ECU 7 includes a bias resistor 70, a communication circuit 71, and other circuits 75. The communication circuit 71, which is for performing a low-speed two-way digital communication such as described in the aforementioned patent document with the power generation control device 1 through a communication terminal C (may be also referred to as "C-terminal" hereinafter) and a communication wire 9, includes a communication receiver 72 constituted by a voltage comparator, a communication driver 73 constituted by a bipolar transistor, and a communication logic 74 performing data transmission and reception process in accordance with a certain low-speed two-way digital communication protocol. The communication receiver 72 compares a voltage appearing at the communication terminal C with a reference voltage which may be half of the battery voltage, and outputs a high-level signal when the voltage at the communication terminal C is equal to or higher than the reference voltage, and a low-level signal when the voltage at the communication terminal C is lower than the reference voltage. The transistor constituting the communication driver 73 has a collector connected to the communication terminal C and also connected to a positive terminal of the battery 4 through the bias resistor 70 and a switch 3, an emitter which is grounded, and a base connected to the communication logic 74. The bias resistor 70 has a resistance of 1 kΩ. The other circuits 75 provide a function of generating the start command and a voltage output command to be given to the power generation control device 1, a function of performing an engine control, etc.

Next, the detail of the power generation control device 1 is given.

The power generation control device 1 includes a power supply circuit 110, a switching transistor 111, a fly-wheel diode 112, a voltage regulating circuit 113, and a communication circuit 120.

The power supply circuit 110 is configured to start its operation of supplying an operation voltage to each part in the power generation control device 1 upon receiving the start command from the communication circuit 120. The switching transistor 111 has a base connected to the voltage regulating circuit 113, a collector connected to the output terminal (may be also referred to as "B-terminal" hereinafter) of the vehicle generator 2 through the fly-wheel diode 112, and an emitter which is grounded. The collector of the switching transistor 111 is also connected to one end of the field winding 21 through an F-terminal, the other end of which is connected to the B-terminal and the output terminal of the rectifier 20. When the switching transistor 111 is turned on, the excitation current is passed into the field winding 21, and when it is turned off, the passage of the excitation current is blocked. The fly-wheel diode 112 parallel-connected to the field winding 21 serves to suppress a surge current due to a voltage induced across the field winding 21 when the switching transistor 111 is turned off. The voltage regulating circuit 113 is configured to compare the output voltage of the vehicle generator 2 with a target regulation voltage, and to on/off-controls the switching transistor 111 in accordance with a result of the comparison. In this embodiment, when the output voltage is lower than the target regulation voltage, the switching transistor 111 is turned on at a certain duty ratio, and when the output voltage is equal to or higher than the target regulation voltage, the switching transistor 111 is turned off. The target regulation voltage is set depending on a target-regulation-voltage setting signal received from the communication circuit 120.

The communication circuit 120, which is for performing the low-speed two-way digital communication with the ECU 7 through the communication terminal C, includes a communication receiver 121 constituted by a voltage comparator, a communication driver 122 constituted by a bipolar transistor, and a communication logic 123 performing data transmission and reception process in accordance with the certain low-speed two-way digital communication protocol. The communication receiver 121 compares a voltage appearing at the communication terminal C with a reference voltage which may be half of the battery voltage, and outputs a high-level signal when the voltage at the communication terminal C is equal to or higher than the reference voltage, and a low-level signal when the voltage at the communication terminal C is lower than the reference voltage. The transistor constituting the communication driver 122 has a collector connected to the communication terminal C through a resistor 130, an emitter which is grounded, and a base connected to the communication logic 123. These communication circuit 120, power supply circuit 110, switching transistor 111, fly-wheel diode 112, and voltage regulating circuit 113 are integrated as an IC circuit 100.

In this embodiment, the resistor 130 is mounted to the IC circuit 100 together with capacitors 132, 134 as external discrete components. The resistor 130 is connected between the communication circuit 120 of the IC circuit 100 and the C-terminal of the power generation control device 1. The resistor 130 has a resistance sufficiently smaller than the resistance (1 kΩ) of the bias resistor 70. In this embodiment, the resistance of the resistor 130 is smaller than 200 ohms. The resistor 130 is disposed away from the IC circuit 100 by such a distance that the IC circuit 100 is not affected by electromagnetic noise which occurs when electrical noise that has arrived at the communication terminal C is attenuated in the resistor 130. The capacitor 132 is connected to the resistor 130 at one terminal thereof, and is grounded at the other terminal thereof. The capacitor 132, which constitutes a low-pass filter together with the resistor 130, has a capacitance of such a small value that a voltage waveform of a digital signal at the communication terminal C is not excessively dulled. In this embodiment, the capacitance of the capacitor 132 is between 1 nF and 50 nF. Incidentally, the capacitor 132 may be removed if the resistor 130 alone is sufficient for the measure against the electrical noise. The capacitor 134 is connected to the output terminal (B-terminal) of the vehicle generator 2 at one terminal thereof and is grounded at the other terminal thereof for noise reduction purpose.

Figure 3:
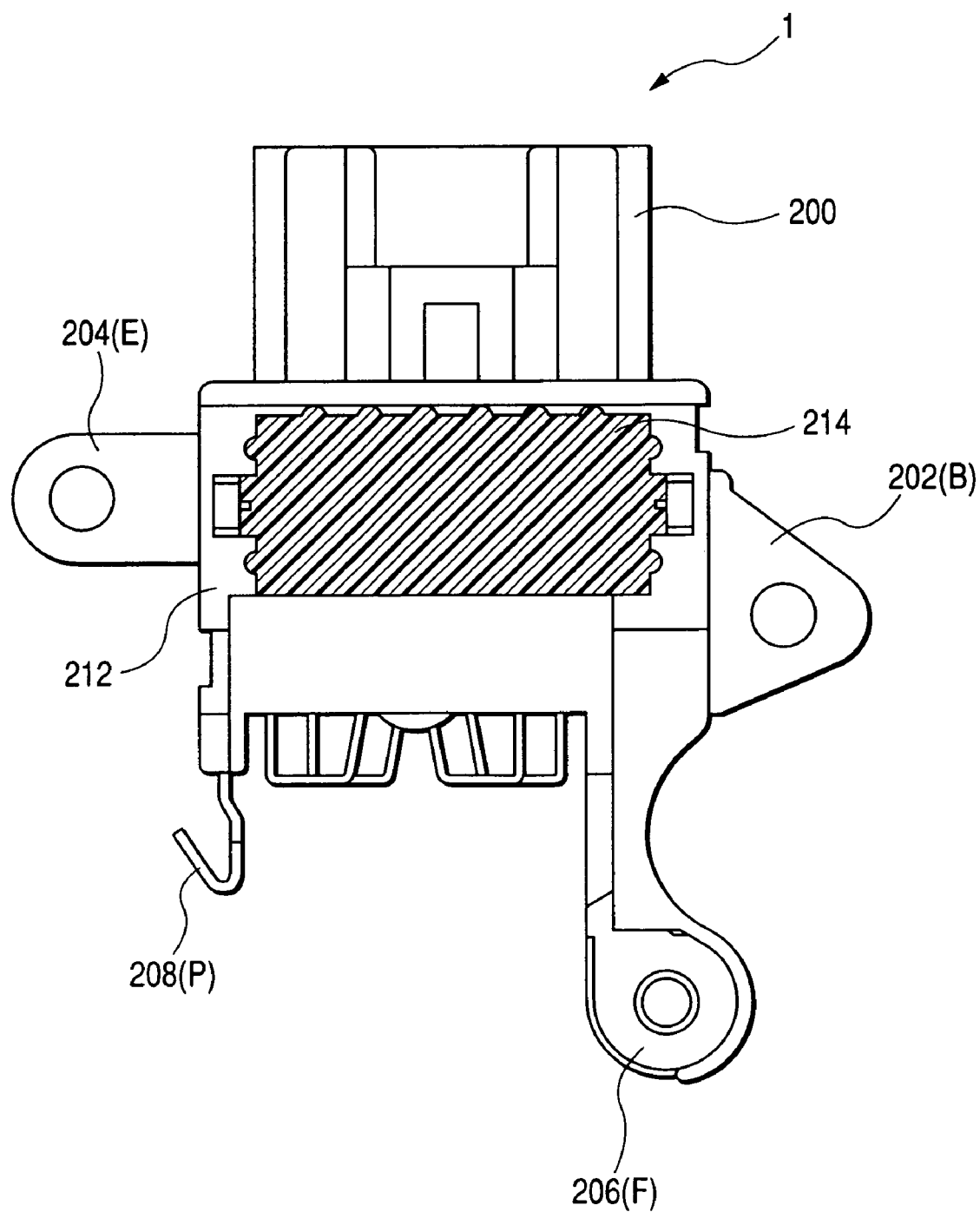
FIG. 3 is a plan outline view of the power generation control device according to the embodiment of the invention.

FIG. 2 is a cross-sectional outline view of the power generation control device 1, and FIG. 3 is a plan outline view of the power generation control device 1. As shown in FIGS. 2 and 3, the power generation control device 1 includes a connector 200 having a shape surrounding the communication terminal C, terminals 202, 204, 206, 208 corresponding to the B-terminal, E-terminal, F-terminal, P-terminal shown in FIG. 1, the IC circuit 100, a radiating fin 210 adhered to the IC circuit 100 by use of a high heat-conductive adhesive, a resin case 212 molded integrally with the connector 200 in which the terminals 202, 204, 206, 208 are insert-molded, the resistor 130 electrically joined to a specific portion of the resin case 212 by solder, for example, the capacitors 132, 134, and a sealing resin 214 for resin-sealing these external components. The resin case 212 has a conductor 140 formed therein for connection between the IC circuit 100 and the resistor 130. The resistor 130 is connected between one end of the conductor 140 and the communication terminal C. The IC circuit 100 is connected to the other end of the conductor 140.

Next, the operation of the power generation control device 1 is explained. When the communication circuit 120 does not transmit a signal, the voltage at the communication terminal C is equal to the battery voltage, because the communication driver 122 is in the off state. In this state, if electrical noise arrives at the communication terminal C, it is possible to prevent this electrical noise from going into the communication receiver 121, because a CR filter (low-pass filter) constituted by the resistor 130 and a stray capacitance of the conductor 140 absorbs the energy of this electrical noise.

When the ECU 7 transmits a low-level digital signal, the voltage at the communication terminal C is about 0V, because the communication driver 73 of the ECU 7 is in the on state. Assuming that the ground potential variation is 1V at a maximum, the voltage at the communication terminal C detected at the side of the communication receiver 121 of the power generation control device 1 does not exceed 1V. In this assumption, even if the battery voltage varies in a range of from 5V to 16V depending on the running state of the engine, the communication receiver 121 can easily detect low level of the voltage at the communication terminal C which is 1V at maximum by the comparison with the reference voltage which does not become lower than 5/2=2.5V.

Allowing for the voltage drop of about 1V across the communication driver 122 and the ground voltage variation, the voltage drop across the resistor 130 has to be lower than 0.5V when the power generation control device 1 transmits a low-level digital signal to the ECU 7. Accordingly, when the resistance of the resistor 130 is R, the following relationship has to be satisfied.

$$(5V-1V-1V)/((1\ k\Omega+R))\times R<0.5V$$

Hence, R has to be smaller than 200Ω. Also in this case, electrical noise arrived at the communication terminal C is sufficiently attenuated by the CR filter constituted by the resistor 130 and the stray capacitance of the conductor 140. Incidentally, by connecting the capacitor 132 across a node between the resistor 130 and the IC circuit 100 and the ground (E-terminal), the electrical noise can be further attenuated.

The power generation control device 1 of this embodiment has a high MC performance because of the structure in which the resistor 130 is connected across the IC circuit 100 and the communication terminal C as an external component, to thereby attenuate external electrical noise arrived at the communication terminal C through the communication wire 9. Generally, it takes a long time to improve EMC performance of an IC circuit, because a design change of the IC circuit is necessary.

In contrast, according to this embodiment, the EMC performance of the IC circuit 100 can be improved quite easily simply by mounting the resistor 130 to the IC circuit 100 as an external component. By connecting the capacitor 132 across the node between the IC circuit 100 and the resistor 130, and the ground, to thereby form a CR filter (low-pass filter) as necessary, it is possible to reliably attenuate the electrical noise.

Since the resistor 130 can be housed in the resin case 212 by modifying only a part of the resin case 212, the cost for the design change necessary for the provision of the resistor 130 is small.

It is a matter of course that various modifications can be made to the above described embodiment of the invention. For example, although the IC circuit 100 and the resistor 130 are disposed three-dimensionally in the resin case 212 in this embodiment as shown in FIG. 2, the present invention is applicable to a case where a monolithic IC circuit including a communication circuit formed on a ceramic substrate, a resistor and capacitors are located in the same plane.

The above explained preferred embodiments are exemplary of the invention of the present application which is described solely by the claims appended below. It should be understood that modifications of the preferred embodiments may be made as would occur to one of skill in the art.

What is claimed is:

1. A power generation control device for a vehicle generator comprising:
   an IC circuit including a communication circuit formed therein and having a function of performing a digital communication with an external device through a communication wire; and
   a resistor mounted to said IC circuit so as to connect said communication circuit to a communication terminal of said power generation control device connected to said communication wire in order to prevent a signal transmitted from said external device from entering said IC circuit directly through said communication wire.

2. The power generation control device according to claim 1, further comprising a capacitor mounted to said IC circuit so as to be connected to a connection node between said IC circuit and said resistor at one terminal thereof and to a ground at the other terminal thereof.

3. The power generation control device according to claim 1, further comprising a connector housing said communication terminal, and a case integrally formed with said connector and housing said IC circuit and said resistor, a conductor connected to said resistor at one end thereof and connected to said communication circuit at the other end thereof being formed in said case.

4. The power generation control device according to claim 2, further comprising a connector housing said communication terminal, and a case integrally formed with said connector and housing said IC circuit, said resistor and said capacitance, a conductor connected to said resistor at one end thereof and connected to said communication circuit at the other end thereof being formed in said case.

5. The power generation control device according to claim 4, wherein said resistor and said capacitor are resin-sealed in said case.

6. The power generation control device according to claim 1, wherein said communication circuit is configured to perform a low-speed two-way digital communication with said external device.

7. The power generation control device according to claim 1, wherein a resistance of said resistor is smaller than 200Ω.

8. The power generation control device according to claim 1, wherein said resistor is disposed away from said IC circuit by such a distance that said IC circuit is not affected by electromagnetic noise occurring when electrical noise arriving at said communication terminal is attenuated in said resistor.

* * * * *